(12) United States Patent
Suita

(10) Patent No.: US 11,084,333 B2
(45) Date of Patent: Aug. 10, 2021

(54) TIRE AND TIRE MANUFACTURING METHOD

(71) Applicant: Toyo Tire Corporation, Itami (JP)

(72) Inventor: Harunobu Suita, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 16/589,803

(22) Filed: Oct. 1, 2019

(65) Prior Publication Data

US 2020/0108677 A1   Apr. 9, 2020

(30) Foreign Application Priority Data

Oct. 3, 2018   (JP) .............................. JP2018-188136

(51) Int. Cl.
*B60C 15/06* (2006.01)
*B60C 19/00* (2006.01)
*B29D 30/00* (2006.01)
*G06K 19/077* (2006.01)

(52) U.S. Cl.
CPC ...... *B60C 15/0607* (2013.01); *B29D 30/0061* (2013.01); *B60C 19/00* (2013.01); *G06K 19/07764* (2013.01); *B29D 2030/0077* (2013.01); *B60C 2015/0625* (2013.01); *B60C 2019/004* (2013.01)

(58) Field of Classification Search
CPC .............. B60C 19/00; B60C 2019/004; B60C 2015/0621; B60C 2015/0617; B29D 30/0061; B29D 2030/007; B29D 2030/0083
See application file for complete search history.

(56) References Cited

U.S. PATENT DOCUMENTS

| 8,977,422 | B1 | 3/2015 | Westfall | |
|---|---|---|---|---|
| 2008/0289736 | A1 | 11/2008 | Adamson et al. | |
| 2011/0175778 | A1 | 7/2011 | Myatt | |
| 2012/0318427 | A1* | 12/2012 | Nishio | B60C 15/06 152/541 |
| 2015/0367685 | A1 | 12/2015 | Takahashi | |

(Continued)

FOREIGN PATENT DOCUMENTS

| CN | 106355238 A  * | 1/2017 |
|---|---|---|
| EP | 3 196 056 A1 | 7/2017 |

(Continued)

OTHER PUBLICATIONS

Machine Translation: KR-101059589-B1; Name not available; (Year: 2020).*

(Continued)

*Primary Examiner* — Kendra Ly
(74) *Attorney, Agent, or Firm* — Maier & Maier, PLLC

(57) ABSTRACT

A tire includes: a bead core; a bead filler extending to an outer side in the tire-radial direction of the bead core; a carcass ply which is folded back around the bead core; a pad member disposed on an outer side in the tire-width direction of the bead filler; and a first rubber sheet disposed in a state covering a folding end of the carcass ply which is folded back, between the bead filler and the pad member, in which a second rubber sheet covering an electronic component is disposed between the bead filler and the pad member on an outer side in the tire-radial direction of the first rubber sheet.

5 Claims, 7 Drawing Sheets

(56) References Cited

U.S. PATENT DOCUMENTS

2016/0107490 A1    4/2016    Randall et al.
2016/0303921 A1*  10/2016    Miklic ............... B60C 15/0607

FOREIGN PATENT DOCUMENTS

| | | | |
|---|---|---|---|
| JP | 2000108619 A | * | 4/2000 |
| JP | 2008265750 A | | 11/2008 |
| JP | 2012218496 A | | 11/2012 |
| JP | 2013067676 A | | 4/2013 |
| JP | 2014151755 A | | 8/2014 |
| JP | 2016037235 A | | 3/2016 |
| JP | 2016049920 A | | 4/2016 |
| JP | 2016539047 A | | 12/2016 |
| JP | 2017222294 A | | 12/2017 |
| JP | 2017537013 A | | 12/2017 |
| KR | 10-2010-0120505 A | | 11/2010 |
| KR | 101059589 B1 | * | 8/2011 |
| WO | 2015088890 A1 | | 6/2015 |

OTHER PUBLICATIONS

Machine Translation: CN-106355238-A, Lu Jiong, (Year: 2020).*
Machine Translation: JP-2000108619-A, Maruyama, Hiroisa, (Year: 2021).*
Extended European Search Report dated Feb. 4, 2020, including the European Search Report and the European Search Opinion, in connection with corresponding EP Application No. 19200349.9 (5 pgs.).
Notice of Reasons for Rejection dated Jun. 4, 2019, in corresponding Japanese application No. 2018-188136; 10 pages.
Decision to Grant a Patent dated Aug. 27, 2019, in corresponding JP Application No. 2018-188136; 5 pages.
Office Action dated May 31, 2021 in corresponding Chinese Application No. 201910909045.3; 7 pages.

* cited by examiner

TIRE AND TIRE MANUFACTURING METHOD

CROSS REFERENCE TO RELATED APPLICATIONS

This application is based on and claims the benefit of priority from Japanese Patent Application No. 2018-188136, filed on 3 Oct. 2018, the content of which is incorporated herein by reference.

FIELD

The present invention relates to a tire in which an electronic component is embedded.

BACKGROUND

Conventionally, tires in which an electric component such as RFID is embedded within the rubber structure have been known. With such tires, by an RFID tag embedded in the tire and a reader as an external device carrying out communication, it is possible to perform production control of tires, usage history management, etc. For example, Japanese Unexamined Patent Application Publication No. 2008-265750 discloses a tire in which an electronic component is arranged at the boundary surface of two difference substances. The boundary surface of two substances at which this electronic component is arranged is a surface extending from a free edge of a carcass ply.

SUMMARY

With the technology shown, the boundary surface between two substances at which the electronic component is arranged becomes a surface extending from a free edge of the carcass ply; however, at this portion, stress and distortion tends to occur upon the tire deforming. Therefore, the electronic portion arranged at this portion is affected by the stress and distortion upon the tire deforming, and there is a possibility of no longer maintaining the function as an electronic component.

The present invention has been made taking account of the above-mentioned problem, and an object thereof is to provide a tire which can maintain the function of an embedded electronic component, by arranging the electronic component at a position which is hardly affected by the stress and distortion within the tire structure.

A tire according to a first aspect of the present invention includes: a bead core; a bead filler which extends to an outer side in a tire radial direction of the bead core; a carcass ply which extends from the bead core to another bead core and is folded around the bead core; a pad member which is disposed at an outer side in a tire-width direction of the bead filler; and a first rubber sheet disposed between the bead filler and the pad member in a state covering a folding end of the carcass ply which is folded back, in which a second rubber sheet covering an electronic component is disposed between the bead filler and the pad member, on an outer side in the tire-radial direction of the first rubber sheet.

According to a second aspect of the present invention, in the tire as described in the first aspect, the second rubber sheet covering the electronic component may be disposed in a region from a tire-radial direction outside end of the first rubber sheet to a tire-radial direction outside end of the bead filler.

According to a third aspect of the present invention, in the tire as described in the first or second aspect, thickness of the first rubber sheet and thickness formed by the second rubber sheet covering the electronic component may be substantially equal thicknesses at an opposing end part.

According to a fourth aspect of the present invention, in the tire as described in any one of the first to third aspects, the first rubber sheet and the second rubber sheet may be formed in a ring shape.

According to a fifth aspect of the present invention, the tire as described in any one of the first to fourth aspects may further include: a reinforcement ply arranged so as to cover the carcass ply around the bead core, in which the pad member may be configured by a first pad covering an outer side in the tire-width direction of the folding end of the carcass ply which is folded back, at an outer side in the tire-radial direction of an end part of the reinforcement ply; and a second pad covering an outer side in the tire-width direction of the first pad.

According to a sixth aspect of the present invention, in the tire as described in any one of the first to fifth aspects, the first rubber sheet may be disposed in a state covering a folding end of the carcass ply which is folded back, from an inner side in the tire-width direction.

According to a seventh aspect of the present invention, a tire manufacturing method for manufacturing the tire as described in the sixth aspect, includes the steps of: pasting the first rubber sheet to the bead filler; and pasting the second rubber sheet covering the electronic component to the bead filler to which the first rubber sheet is pasted, with a reference of a pasting position of the first rubber sheet.

According to the present invention, it is possible to provide a tire which can maintain the function of an embedded electronic component, by arranging the electronic component at a position which is hardly affected by the stress and distortion within the tire structure.

DETAILED DESCRIPTION

First Embodiment

Figure 1:
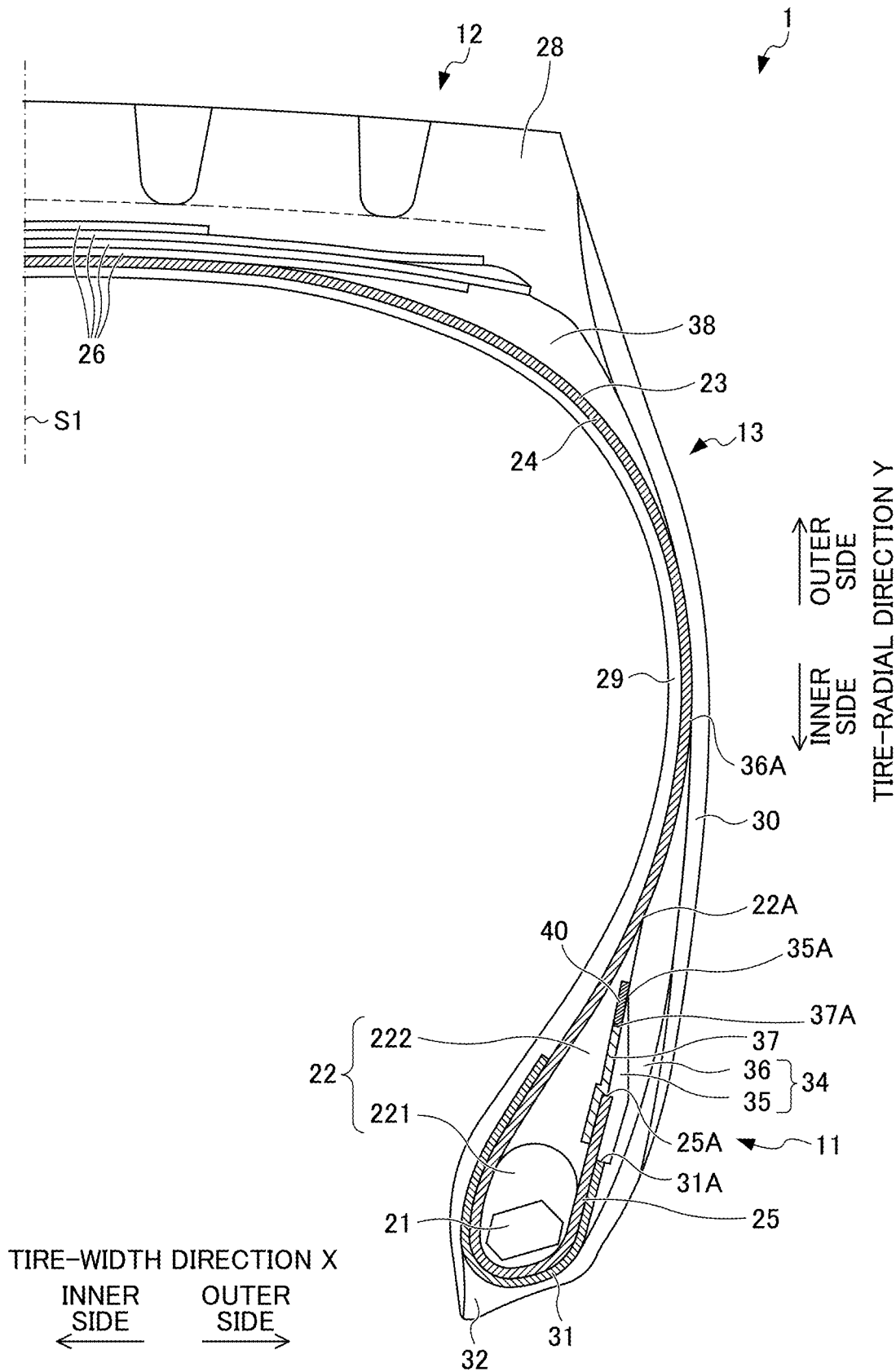
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2 and 5.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead filler 22 is configured by a first bead filler 221 which covers the outer circumference of the bead core 21, and a second bead filler 222 which is arranged on the outer side in the tire-radial direction of the first bead filler 221. The second bead filler 222 is configured from rubber with a modulus higher than an inner liner 29 and side wall rubber 30 described later. Then, the first bead filler 221 is configured from rubber of an even higher modulus than the second bead filler 222. It should be noted that the first bead filler 221 may be a form not covering the outer circumference of the bead core 21, if at least a part thereof is arranged on the outer side in the tire-radial direction of the bead core 21. In addition, the bead filler 22 may be formed from rubber of one type. In other words, it may not necessarily be divided into the first bead filler 221 and second bead filler 222. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22. The carcass ply 23 is configured by a plurality of ply cords extending in a tire-width direction. In addition, a plurality of ply cords is arranged side by side in a tire circumferential direction. This ply cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern (not illustrated) is provided to the outer surface of the tread rubber 28, and this outer surface serves as a contact surface which contacts with the road surface.

In the vicinity of the outer side in the tire-width direction of the tread 12, in a region between the carcass ply 23, and the steel belts 26/tread rubber 28, a shoulder pad 38 is provided. This shoulder pad 38 extends until a region of the outer side in the tire-radial direction of the side wall 13, and part thereof forms an interface between side wall rubber 30 described later. In other words, in the region of the outer side in the tire-radial direction of the side wall 13, a part of the shoulder pad 38 is present on the inner side in the tire width direction of the side wall rubber 30. The shoulder pad 38 consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover at least part of the carcass ply 23. The steel chafer 31 also extends to the outer side in the tire-width direction of the ply folding part 25 of the carcass ply 23, and an end part 31A of this steel chafer 31 is positioned more to the inner side in the tire-width direction than the folding end 25A of the ply folding part 25. This steel chafer 31 is a metal reinforcement layer configured by metal steel cords, and is covered by rubber.

Rim strip rubber 32 is provided at the inner side in the tire-radial direction of the steel chafer 31. This rim strip rubber 32 is arranged along the outer surface of the tire, and connects with the side wall rubber 30. This rim strip rubber 32 and side wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. This first pad 35 is provided so as to cover the outer side in the tire-width direction of at least the folding end 25A of the ply folding part 25. The outer side in the tire-radial direction of the first pad 35 is formed so as to taper as approaching the outer side in the tire-radial direction.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, part of the second bead filler 222, and part of the ply body 24 of the carcass ply 23. Then, the side-wall rubber 30 is arranged at the outer side in the tire-width direction in a region of the outer side in the tire-radial direction of the second pad 36, and the rim strip rubber 32 is arranged at an outer side in the tire-width direction in a region on the inner side in the tire-radial direction of the second pad 36. In other words, the second pad 36 is provided between the first pad 35, etc., and the rim strip rubber 32 and side wall rubber 30, which are members constituting the outer surface of the tire.

Herein, the first pad 35 and second pad 36 are configured by rubber of higher modulus than the modulus of the bead filler (second bead filler 222) to which these members contact. In more detail, the second pad 36 is configured by rubber of higher modulus than the second bead filler 222, and the first pad 35 is configured by rubber of even higher modulus than the second pad 36. The first pad 35 and second pad 36 have a function of mitigating sudden distortion caused by the local rigidity point of change at the folding end 25A of the carcass ply 23 and the end part 31A of the steel chafer 31.

At the inner side in the tire-width direction of the first pad 35, a first rubber sheet 37 is arranged in the vicinity of the folding end 25A of the ply folding part 25. The first rubber sheet 37 is arranged so as to cover at least the folding end 25A of the ply folding part 25 from the inner side in the tire-width direction.

Generally, at the folding end 25A of the ply folding part 25, stress tends to concentrate. However, by providing the aforementioned first pad 35 and second pad 36, and further arranging the first rubber sheet 37, it becomes possible to effective suppress the concentration of stress. It should be noted that it is preferable for the pad member 34 to be configured by the aforementioned first pad 35 and second pad 36 to mitigate the influence of distortion. It should be noted that the first rubber sheet 37 preferably adopts a form arranging so as to cover the folding end 25A of the ply folding part 25 from the inner side in the tire-width direction, as shown in FIG. 1; however, it will possess a similar effect even if adopting a configuration covering the folding end 25A of the ply folding part 25 from the outer side in the tire-width direction.

An RFID tag 40 is embedded as an electrical component in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is established at an antenna length optimized according to the frequency band, etc. to be used. In a storage part inside the RFID chip, identification information such as a manufacturing number and part number is stored.

Figure 2:
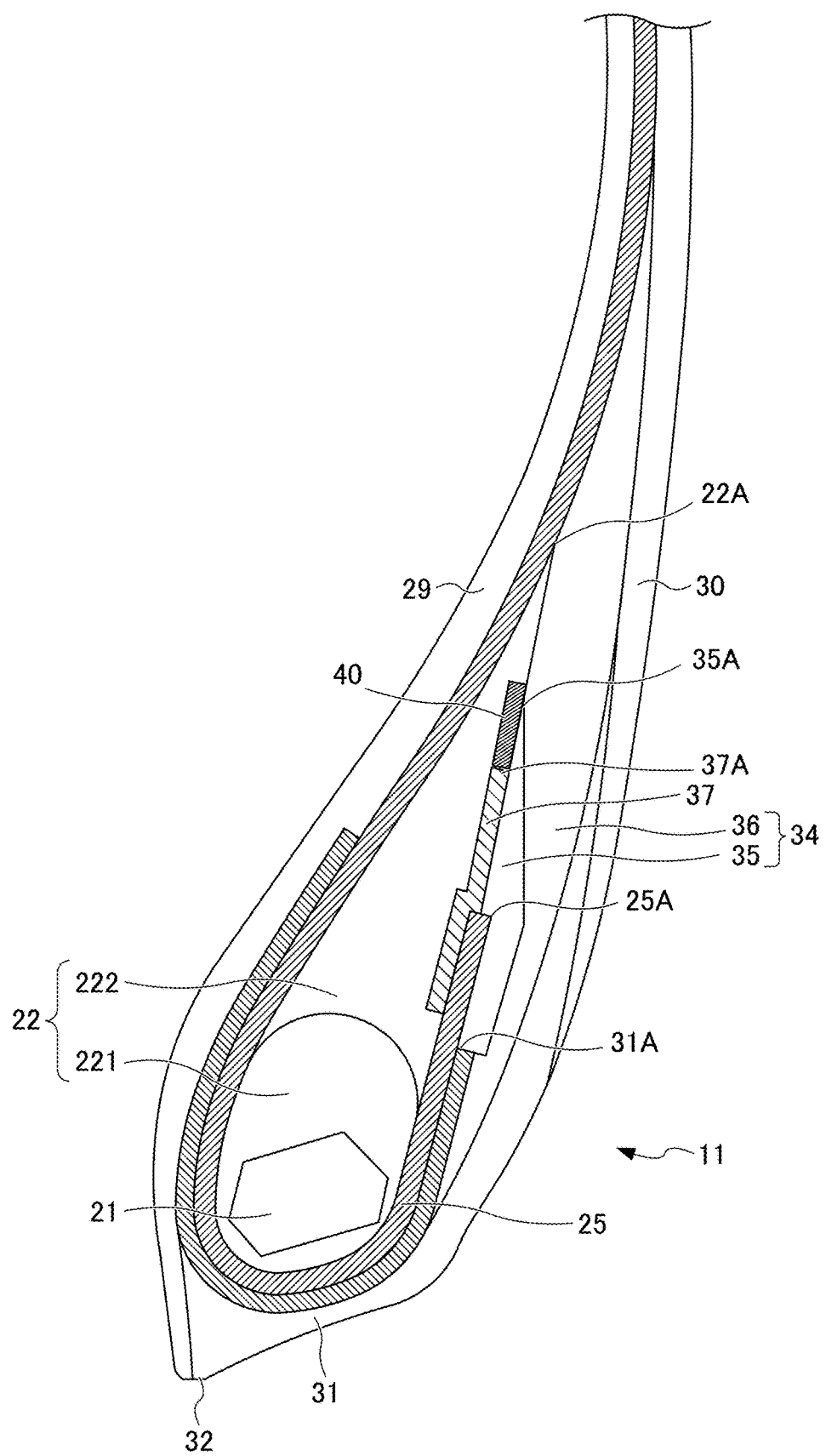
FIG. 2 is a partially enlarged cross-sectional view of a tire according to the first embodiment of the present invention.

FIG. 2 is an enlarged cross-sectional view showing the periphery of an embedded part of the RFID tag 40 in the tire 1 of FIG. 1. As shown in FIGS. 1 and 2, the RFID tag 40 is arranged between the bead filler 22 and the pad member 34 arranged on the outer side in the tire-width direction of the bead filler 22, at the outer side in the tire-radial direction of the first rubber sheet 37. In the present embodiment, the pad member 34 arranged on the outer side in the tire-width direction of the bead filler 22 is configured by a first pad 35 and a second pad 36. Herein, the RFID tag 40 is covered by a rubber sheet serving as a protective member described later. The RFID tag 40 covered by the rubber sheet, as shown in FIGS. 1 and 2, is arranged in a region between the tire-radial direction outside end 37A of the first rubber sheet 37 and the tire-radial direction outside end 22A of the bead filler 22.

It should be noted that, if establishing the modulus of the second pad 36 as a reference, the side-wall rubber 30 is preferably established with a modulus of 0.4 to 0.6 times that of the second pad 36. In addition, the first pad 35 is preferably established with a modulus of 1.1 to 1.2 times that of the second pad 36. In addition, the second bead filler 22 is preferably established with a modulus of 0.7 to 0.8 times that of the second pad. By establishing such a modulus, it is possible to keep a balance of flexibility as a tire and rigidity in the vicinity of the bead 11. It should be noted that the modulus indicates 100% elongation modulus (M100) under a 23° C. atmosphere, measured in accordance with "3.7 stress at a given elongation, S" of JIS K6251:2010.

As mentioned above, normally, in a case of the boundary surface of two substances being a surface extending from the folding end 25A of the carcass ply 23, distortion tends to occur at this surface. However, in the present embodiment, the first rubber sheet 37 is arranged in a form covering the folding end 25A of the carcass ply 23, between the bead filler 22 and the pad member 34 arranged at the outer side in the tire-width direction of the bead filler 22; therefore, the outer side in the tire-radial direction of the first rubber sheet 37 becomes a portion which is hardly influenced by distortion.

Figure 3:
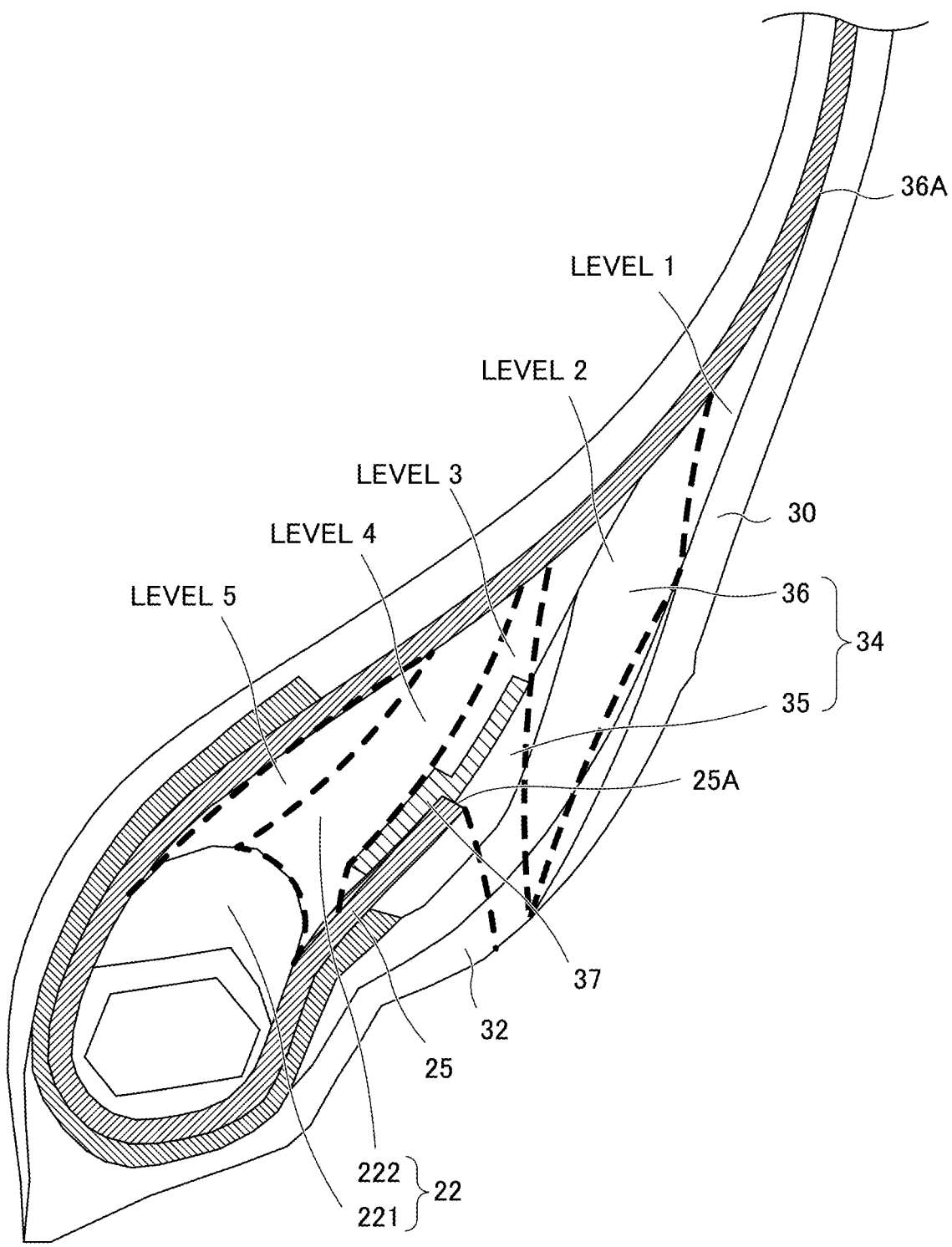
FIG. 3 is a view showing results of an in-plane distribution simulation of strain energy in a case of applying load to the tire of the first embodiment of the present invention.

FIG. 3 is a view showing the results of in-plane distribution simulation of strain energy, in a case of assembling the tire 1 of the present invention to a rim, and applying 100% load. The enlarged cross-sectional view shown in FIG. 3 displays by dividing the region in five, according to the magnitude of the strain energy. Herein, a region having the highest strain energy is defined as level 5, a region having high strain energy is defined as level 4, a region in which the strain energy somewhat declined is defined as level 3, a region in which the strain energy further declined is defined as level 2, and the region in which the strain energy declined the most is defined as level 1. FIG. 3 displays by dividing the regions with bold dotted lines as the boundary.

On the outer side in the tire-radial direction of the first rubber sheet 37, the boundary surface between the bead filler 22 and the pad member 34 arranged on the outer side in the tire-width direction of the bead filler 22 becomes a region of mostly level 2, and thus there is little strain energy. Consequently, upon arranging the RFID tag 40, it is a preferable region. In addition, this position is a position separated a certain extent from the outer surface of the tire 1; therefore, the influence relative to external wounds is also hardly received. Furthermore, since the outer side in the tire-width direction is protected by the second pad 36 having a high modulus of elasticity, it hardly receives influence relative to external wounds.

Figure 4A:
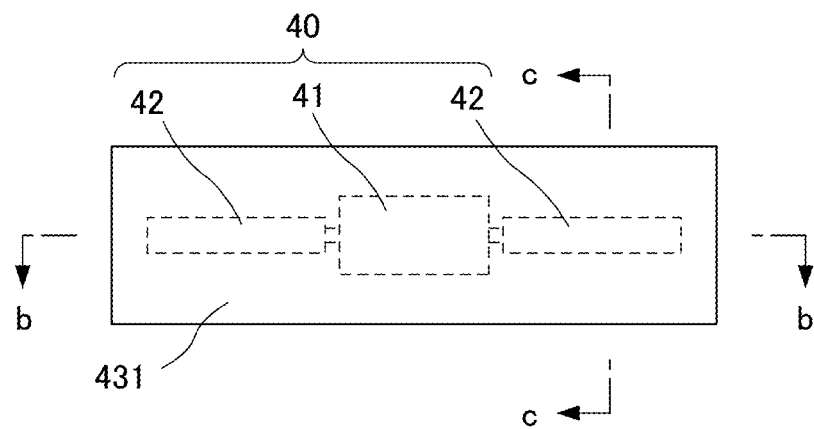
FIG. 4A is a view showing an RFID tag which is protected by a protective member in a tire according to the first embodiment of the present invention.
Figure 4B:
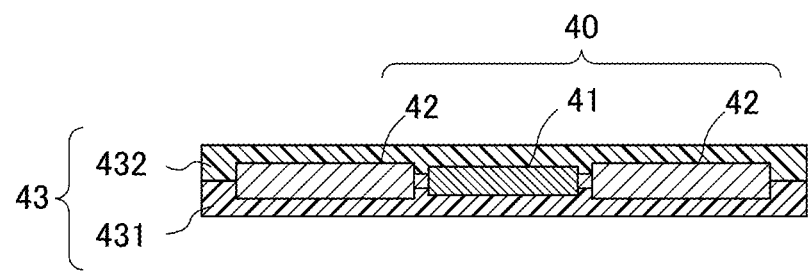
FIG. 4B is a view showing along the cross section b-b in FIG. 4A.
Figure 4C:
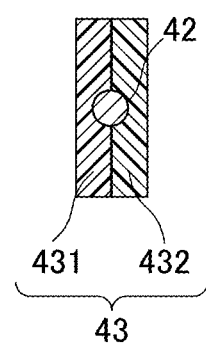
FIG. 4C is a view showing along the cross section c-c in FIG. 4A.

Herein, the RFID tag 40 is covered by the rubber sheets 431, 432 constituting the second rubber sheet 43. In other words, in the present embodiment, the second rubber sheet 43 is constituted by the two rubber sheets 431, 432. This point will be explained while referencing FIGS. 4A to 4C. FIG. 4A is a view showing the RFID tag 40 covered by the protective member 43 serving as the second rubber sheet. In FIG. 4A, the RFID tag 40 is covered and hidden by the rubber sheet 431 described later. FIG. 4B is a cross-sectional view along the line b-b in FIG. 4A, and FIG. 4C is a cross-sectional view along the line c-c in FIG. 4A. In the present embodiment, as shown in FIGS. 4A to 4C, the RFID tag 40 is covered by the protective member 43.

The RFID tag 40 includes an RFID chip 41 and antenna 42 for performing communication with external equipment. As the antenna 42, a coil-shaped spring antenna, plate-shaped antenna, and various types of rod-shaped antennas can be used. When considering the communicability and flexibility, a coil-shaped spring antenna is the most preferable.

The protective member 43 is configured from two rubber sheets 431, 432 which protect by sandwiching the RFID tag 40.

The protective member 43 is configured by rubber of a predetermined modulus, for example.

As the rubber adopted in the protective member 43, rubber at least having a higher modulus than the side wall rubber 30 is used. For example, rubber having a higher modulus than the second bead filler 222 and lower modulus than the pad member 34 is used.

For example, with the modulus of the side wall rubber 30 as a reference, it is preferable to use rubber of a modulus 1.1 to 1.8 times as the rubber used in the protective member 43. At this time, as the rubber of the second pad 36, rubber of a modulus 1.6 to 3 times that of the side wall rubber, for example, rubber of a modulus on the order of 2 times thereof, may be used. It should be noted that, if emphasizing reinforcement of the protection of the RFID tag 40, rubber of a modulus higher than the second pad 36 may be adopted as the rubber used in the protective member 43.

It should be noted that, as shown in FIGS. 1 and 2, the RFID tag 40 is arranged in the region between the bead filler 22 and pad member 34. Therefore, by setting the modulus of the protective member 43 to a value with a higher modulus than the bead filler 22 and a lower modulus than the pad member 34, in the case of the tire distorting, it is possible to prevent excessive stress from generating within the rubber structure at the embedded part of the RFID tag 40. In other words, it is possible to suppress the generation of stress.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as would raw rubber, and thus can appropriately protect the RFID tag 40.

In addition, as the protective member 43, an organic fiber layer from polyester fibers or polyamide fibers may be provided. It is also possible to embed an organic fiber layer in the two rubber sheets 431, 432.

Herein, the thickness of the first rubber sheet 37 and the thickness after coating formed by the two rubber sheets 431, 432 covering the RFID tag 40 are preferably substantially the same thicknesses, as shown in FIGS. 1 and 2 at opposing end parts. By making as substantially the same thickness, there will not be a step in this portion. It is thereby possible to suppress mixing of air, and thus the quality of the tire when completed improves.

Figure 5:
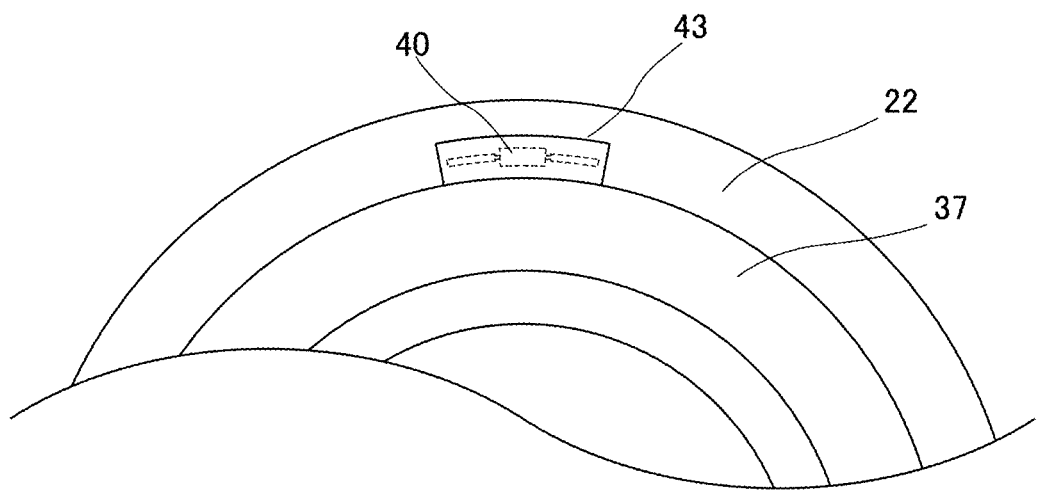
FIG. 5 is a view showing a state pasting to bead filler a first rubber sheet and the RFID tag protected by the protective member, in the tire according to the first embodiment of the present invention.

FIG. 5 is a drawing when viewing the bead filler 2 during the manufacturing process from an outer side in the tire-width direction, and shows a state pasting the first rubber sheet 37 and the RFID tag 40 protected by the protective member 43 to the bead filler 22. As shown in FIG. 5, the bead filler 22 and first rubber sheet 37 constituting the bead 11 are each ring shapes. In other words, the bead filler 22 and first rubber sheet 37 constituting the bead 11 are each hollow disk shapes.

The RFID tag 40 is mounted in the manufacturing process of the tire prior to the vulcanization process. In the present embodiment, as shown in FIG. 5, the first rubber sheet 37 is pasted to the bead filler 22 prior to being vulcanized, and subsequently, the rubber sheet 431 or 432 covering the RFID tag 40 is pasted with the reference of the pasting position of the first rubber sheet 37. At this time, the bead filler 22, first rubber sheet 37 and the rubber sheet 431, 432 covering the RFID tag 40, due to being in the state of raw rubber prior to vulcanization, can be pasted using the adhesive property thereof. Alternatively, in a case of the adhesive property being low or the like, it may be pasted using an adhesive, etc. After pasting the rubber sheet 431 or 432, the rubber sheets 431 and 432 are interposed by the bead filler 22 and pad member 34. Subsequently, the green tire in which each constituent member including the RFID tag 40 is assembled is vulcanized in the vulcanization process to manufacture the tire.

It should be noted that the first rubber sheet 37 is formed in a ring shape so as to establish a situation covering the folding end 25A of the carcass ply 23 over the entire circumference after green tire assembly.

It should be noted that, the first rubber sheet 37 is pasted to the pad member 34, and subsequently, the rubber sheet 431 or 432 covering the RFID tag 40 may be pasted with the pasting position of the first rubber sheet as a reference, and then establishing a situation interposed by the bead filler 22.

In this way, in the present embodiment, since it is possible to paste the RFID tag 40 using rubber in its raw rubber state, at the time of tire manufacture, the assembly work of the RFID tag 40 in the manufacturing process of the tire is easy.

In particular, the bead filler 22 has a certain rigidity even in the raw rubber state, and thus the assembly work of the RFID tag 40 is easy.

In addition, if configuring the protective member 43 by way of two rubber sheets, since it is possible to thinly form the RFID tag 40 including the protective member 43, it is favorable upon embedding in the tire 1. In addition, when assembling the RFID tag 40 in the constituent members of the tire 1 prior to vulcanizing, the RFID tag 40 covered by the rubber sheet can be very easily installed. For example, at the desired position of members such as the bead filler 22 prior to vulcanization, it is possible to appropriately paste the RFID tag 40 covered by the rubber sheet using the stickiness of raw rubber. In addition, by also establishing the rubber sheets 431, 432 as raw rubber prior to vulcanization, it is possible to more easily paste also using the stickiness of the rubber sheets themselves.

However, the protective member 43 can be employed in various forms, not limited to the form configured by two rubber sheets. For example, so long as the rubber sheet constituting the protective member covers at least part of the RFID tag 40, effects such as an improvement in workability during the manufacturing process and stress mitigation are obtained. In addition, for example, it may be a configuration wrapping one rubber sheet over the entire circumference of the RFID tag 40, or a configuration adhering a protective member in the form of a potting agent having high viscosity over the entire circumference of the RFID tag 40. Even if such a configuration, it is possible to appropriately protect the RFID tag 40.

It should be noted that the RFID tag 40 covered by the protective member 43 is embedded in the tire so that the longitudinal direction thereof is the direction of a tangent line relative to the circumferential direction of the tire, i.e. direction orthogonal to the paper plane in the cross-sectional views of FIGS. 1 and 2. In addition, the rubber sheets 431, 432 are embedded in the tire in a form such that is aligned in the tire-width direction. In other words, in the manufacturing process, one side of either of the rubber sheets 431, 432 is pasted to a constituent member of the tire prior to vulcanization, i.e. the bead filler 22. By establishing such a form, stress hardly acts on the RFID tag 40 also when the tire deformed. In addition, the work for attaching the RFID tag 40 covered by the protective member 43 in the manufacturing process becomes simple.

Herein, in the attaching process of the RFID tag 40, by establishing the outer circumference of the ring-shaped first rubber sheet 37 as a reference, it is possible to easily arrange the RFID tag 40 covered by the protective member 43 in the aforementioned direction. In other words, as shown in FIG. 5, the rubber sheets 431, 432 covering the RFID tag 40 are pasted along the outer circumference of the ring-shaped first rubber sheet 37. At this time, as shown in FIG. 5, the rubber sheets 431, 432 formed by the raw rubber can also be pasted while deformed so as to run along the outer circumference of the first rubber sheet 37. Using a flexible coil-shaped spring antenna or the like as the antenna of the RFID tag 40, a form such that the antenna also deforms following the deformation of the rubber sheets 431, 432 may be established. Alternatively, with the reference of the outer circumference of the ring-shaped first rubber sheet 37, the longitudinal direction of the rubber sheets 431, 432 covering the RFID tag 40 may be pasted so as to substantially match the tangential direction of the outer circumference of the ring-shaped first rubber sheet 37. By way of this method, it is possible to arrange the RFID tag 40 covered by the protective member 43 simply and accurately in the aforementioned direction, without giving special markers. In addition, the thickness of the bead when tire is completed is also stable, and the variation in manufacture also decreases.

Figure 6:
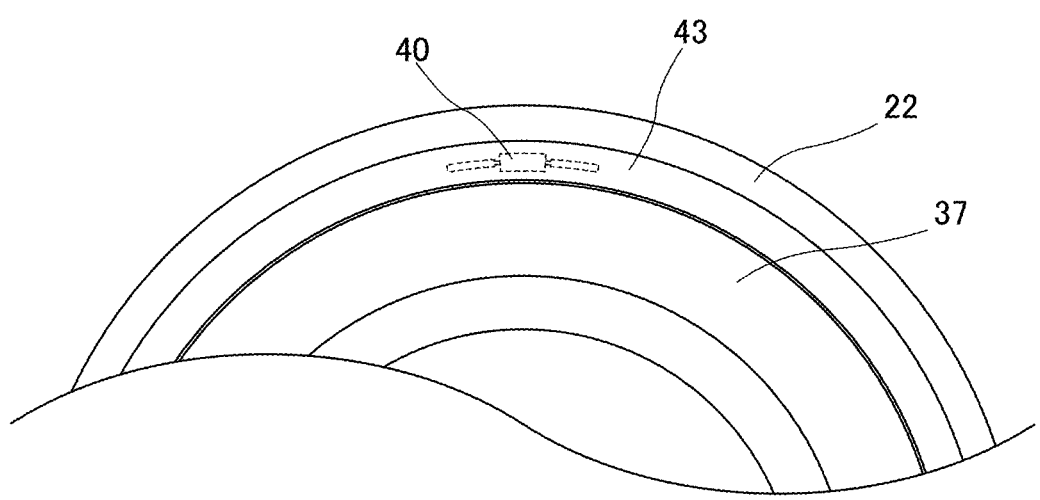
FIG. 6 is a view showing a modified example of a protective member.

Furthermore, as shown in FIG. 6, the first rubber sheet and the rubber sheets 431, 432 forming the protective member may be formed in ring shapes. It is thereby possible to suppress mixing of air during assembly, and possible to improve the quality when the tire is completed.

It should be noted that, in the present embodiment, although the RFID tag 40 is embedded in the tire as an electronic component, the electronic component embedded in the tire is not limited to an RFID tag. For example, it may be various electronic components such as a sensor which carries out wireless communication. In addition, since the electronic component handles electrical information such as sending and receiving of electrical signals, there is a possibility of the performance declining due to metal components being present in the vicinity thereof. In addition, there is a possibility of the electronic component being damaged by excessive stress being applied. Consequently, even in the case of embedding various electronic components in a tire, it is possible to obtain the effects of the present invention. For example, the electronic component may be a piezoelectric element or strain sensor.

According to the tire 1 of the present embodiment, the following effects are exerted.

(1) The tire 1 according to the present embodiment includes the first rubber sheet 37 arranged between the bead filler 22 and pad member 34 in a form covering the folding end 25A of the carcass ply which was folded back, and the rubber sheets 431, 432 covering the RFID tag 40 are arranged between the bead filler 22 and pad member 34 on the outer side in the tire-radial direction of the first rubber sheet 37. The RFID tag 40 can thereby keep the function thereof, without being influenced by excessive distortion.

(2) In the tire 1 according to the present embodiment, the rubber sheets 431, 432 covering the RFID tag 40 are arranged in a region between the tire-radial direction outside end 37A of the first rubber sheet 37 and the tire-radial direction outside end 22A of the bead filler 22. The RFID tag 40 is thereby even less influenced by distortion.

(3) In the tire 1 according to the present embodiment, the thickness of the first rubber sheet 37 and the thicknesses of the rubber sheets 431, 432 formed to cover the RFID tag 40 are substantially the same thicknesses at an opposing end part. It is thereby possible to suppress mixing of air during assembly, and thus the quality when the tire is completed improves.

(4) In the tire 1 according to the present embodiment, the first rubber sheet 37 and the rubber sheets 431, 432 are formed in ring shapes. It is thereby possible to suppress mixing of air during assembly, and thus the quality during tire completion improves.

(5) The tire 1 according to the present embodiment further includes the steel chafer 31 arranged so as to cover the carcass ply 23 around the bead filler 21, and the pad member 34 is configured, at the outer side of the tire-radial direction of the end part 31A of the steel chafer 31, from the first pad 35 covering the outer side in the tire-width direction of the folding end 25A of the carcass ply 23 which is folded back, and the second pad 36 covering the outer side in the tire-width direction of the first pad 35. The amount of distortion generated at the boundary surface between the bead filler 22 and pad member 34 is thereby suppressed.

(6) In the tire 1 according to the present embodiment, the first rubber sheet 37 is arranged in a form covering the folding end 25A of the carcass ply 23 which is folded back, from the inner side in the tire-width direction. The amount of distortion generated at the boundary surface between the bead filler 22 and pad member 34 is thereby suppressed.

(7) The manufacturing method of the tire 1 according to the present embodiment includes: a step of pasting the first rubber sheet 37 to the bead filler 22, and pasting the rubber sheets 431, 432 covering the RFID tag 40 on the bead filler 22 to which the first rubber sheet 37 is pasted, with the reference of the pasting position of the first rubber sheet 37. It is thereby possible to arrange the RFID tag 40 covered by the protective member 43 simply and accurately in the aforementioned direction, without giving special markers. In addition, the thickness of the bead when the tire is completed is also stable, and the variation in manufacture also decreases.

Second Embodiment

Next, a tire according to a second embodiment will be explained while referencing FIGS. 7 to 13. It should be noted that, in the following explanation, the same reference symbol will be attached for configurations which are the same as the first embodiment, and detailed explanations thereof will be omitted. The present embodiment is a particularly preferable embodiment in the case of the antenna of the RFID tag 40 being a coil-shaped spring antenna.

In the RFID tag 40 of the present embodiment, a coil-shaped spring antenna 421 having high communicability and flexibility can be used as the antenna. The spring antenna 421 is set to an antenna length which was optimized according to the frequency band, etc. to be used.

In the present embodiment, prior to interposing the RFID tag 40 by the two rubber sheets 431, 432 constituting the protective member 43, the rubber is arranged within the spring antenna 421. More preferably, rubber is filled into the spring antenna, so that air will not remain as much as possible. This process and the reason for adopting this process will be explained using FIGS. 7 to 13.

Figure 7:
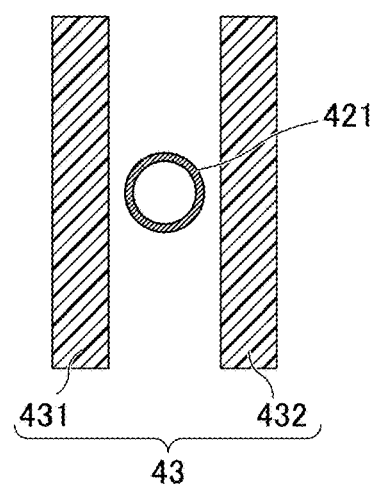
FIG. 7 is a view showing a cross section prior to interposing the RFID tag by rubber sheets in a case of not filling rubber into a spring antenna.
Figure 8:
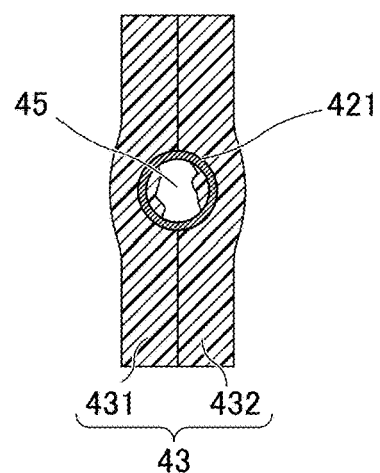
FIG. 8 is a view showing a cross section after interposing the RFID tag by rubber sheets in a case of not filling rubber inside a spring antenna.

First, a state of the surroundings of the RFID tag 40 in a case of not filling rubber into the spring antenna 421 will be explained as a reference example using FIGS. 7 to 9. FIG. 7 is a view showing a cross section of the spring antenna 421, and rubber sheets 431, 432, prior to interposing the RFID tag 40 by the rubber sheets 431, 432. FIG. 8 is a view showing a cross section of the spring antenna 421, and rubber sheets 431, 432, after interposing the RFID tag 40 by the rubber sheets 431, 432.

As shown in FIG. 8, in this reference example, since rubber is not filled into the spring antenna 421 in advance, a certain amount of air 45 may remain within the spring antenna 421 after interposing by the rubber sheets 431, 432. If air remains in this way, the integrity of the rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the rubber sheets 431, 432 herein. Consequently, by pushing the rubber sheets 431, 432 from both sides, the rubber sheets 431, 432 sticks to some extent inside the spring antenna as shown in FIG. 8. However, very large amounts of time and labor are required in order to stick the rubber sheets 431, 432 until the inside of the spring antenna is completely embedded.

Figure 9:
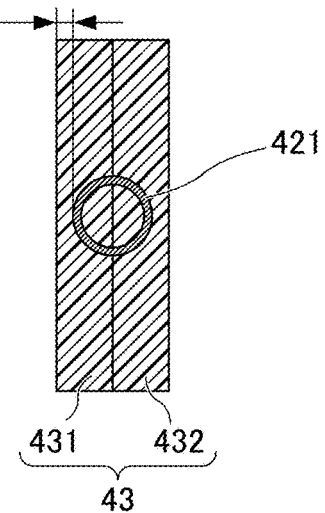
FIG. 9 is a view showing a cross section after interposing the RFID tag by rubber sheets in a case of not filling rubber into a spring antenna.

Then, even if assuming a case of taking time and sticking the rubber sheets until the inside of the spring antenna is embedded, the distance L between the outer circumferential part of the spring antenna 421 and the outer surface of the rubber sheets 431, 432 becomes very short, as shown in FIG. 9. In addition, it is difficult to stabilize this distance L, and locally thin portions can occur. Consequently, the protection of the RFID tag 40 by the rubber sheets 431, 42 becomes insufficient, and during vulcanization, there is a possibility of the rubber sheets 431, 432 being damaged.

Therefore, in the present embodiment, prior to interposing the RFID tag 40 by the rubber sheets 431, 432, the rubber is arranged within the spring antenna 421, as shown in FIGS. 10 to 13. More preferably, rubber is filled within the spring antenna so that air does not remain as much as possible. It should be noted that the views shown on the right sides of FIGS. 10 to 13 are views showing a transverse section of the spring antenna 421 and the surrounding thereof.

Figure 10:
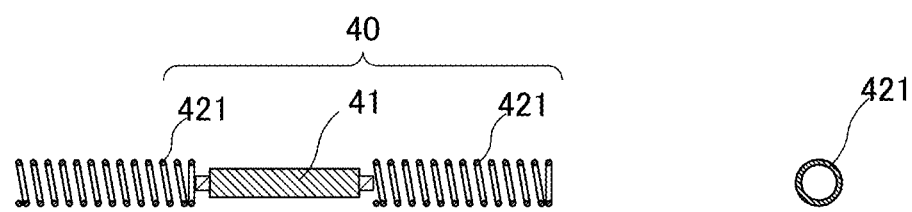
FIG. 10 is a view showing the RFID tag prior to filling rubber inside a spring antenna in a tire according to a second embodiment of the present invention.
Figure 11:
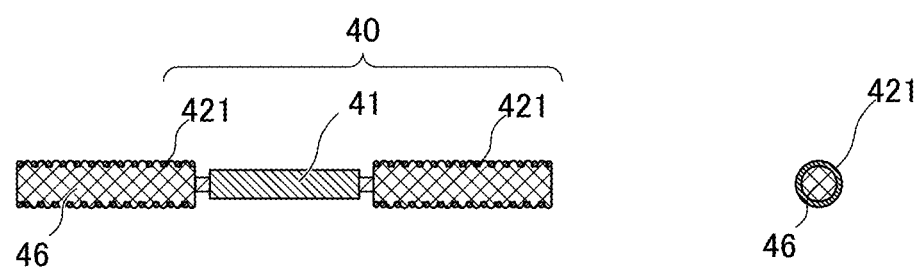
FIG. 11 is a view showing the RFID tag after filling rubber inside a spring antenna in a tire according to the second embodiment of the present invention.

FIG. 10 is a view showing a state prior to filling the rubber 46 into the spring antenna 421, and FIG. 11 is a view showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the rubber sheets 431, 432 as the rubber 46, in consideration of the workability, etc. It should be noted that preferably unvulcanized rubber is used as the rubber 46 arranged within the spring antenna 421. By establishing the rubber 46 and rubber sheets 431, 432 as unvulcanized rubber and vulcanizing simultaneously, the integrity of the rubber 46, rubber sheets 431, 432 and spring antenna 421 rises. In addition, the rubber 46, and rubber sheets 431, 432 are more preferably established as the same type of rubber. It should be noted that, by emphasizing the flexibility of the spring antenna 421, rubber of lower modulus than the rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 12:
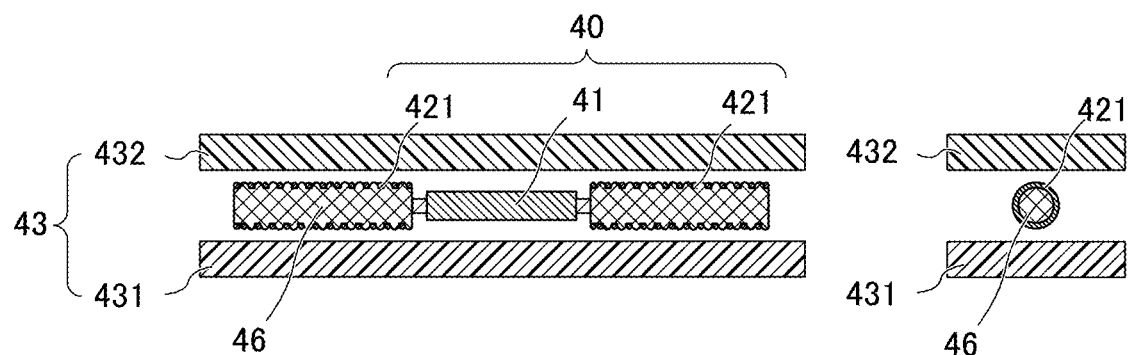
FIG. 12 is a view showing the RFID tag prior to interposing by rubber sheets, in a tire according to the second embodiment of the present invention.
Figure 13:
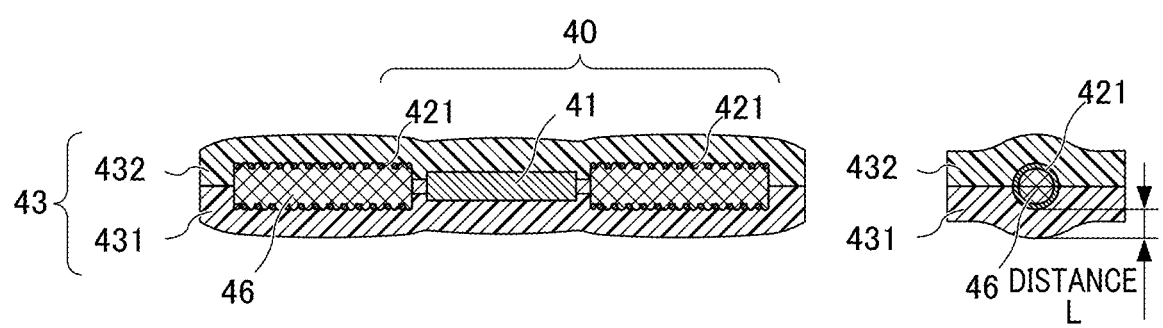
FIG. 13 is a view showing the RFID tag interposed by a rubber sheet, in a tire according to the second embodiment of the present invention.

FIG. 12 is a view showing a state prior to interposing the RFID tag 40 into which the rubber 46 is filled in the spring antenna 421, by the rubber sheets 431, 432, and FIG. 13 is a view showing a state after interposing by the rubber sheets 431, 432.

As shown in FIG. 13, according to the present embodiment, since the rubber 46 is filled in advance into the spring antenna 421, no air pockets exist between the rubber sheets 431, 432. Consequently, since it is unnecessary to be concerned over air pockets, the process of interposing the RFID tag 40 by the rubber sheets 431, 432 also becomes easy. In addition, by the rubber 46 being arranged within the spring antenna 421, the integrity of the spring antenna 421, rubber 46, and rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the rubber sheets 431, 432 stabilizes. In other words, a distance close to the thickness of the rubber sheets 431, 432 is generally secured as this distance L. Consequently, the RFID tag 40 is sufficiently protected by the rubber sheets 431, 432. In the present embodiment, the RFID tag 40 interposed by the rubber sheets 431, 432 is fixedly set up at the bead filler 22, etc., and subsequently, the green tire is vulcanized.

According to the tire of the present embodiment, the following effects are exerted in addition to the above (1) to (5).

(6) The present embodiment provides a step of arranging the rubber 46 within the spring antenna 421 of the RFID tag 40 serving as an electronic component having a communication function; a step of interposing the RFID tag 40 having the spring antenna 421 into which the rubber 46 was arranged, by the rubber sheets 431, 432, and an arrangement step of arranging the RFID tag 40 interposed by the rubber sheets 431, 432 in the tire 1. The air 45 will thereby not remain inside the spring antenna 421. In addition, since it is unnecessary to be concerned about air pockets, the work of interposing the RFID tag 40 by the rubber sheets 431, 432 also becomes easy. In addition, since the distance L between the outer circumferential part of the spring antenna 421 and the outer surface of the rubber sheets 431, 432 is stabilized, the RFID tag 40 is sufficiently protected by the rubber sheets 431, 432.

It should be noted that, although the tire of the present invention can be adopted as various types of tires such as for cars, light trucks, trucks and buses, it is particularly suitable as a tire of a truck, bus, etc. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:

1. A tire comprising:
a bead core; a bead filler which extends to an outer side in a tire radial direction of the bead core; a carcass ply which extends from the bead core to another bead core and is folded around the bead core; a pad member which is disposed at an outer side in a tire-width direction of the bead filler; and a first rubber sheet disposed between the bead filler and the pad member in a state covering a folding end of the carcass ply which is folded back,
wherein a second rubber sheet covering an electronic component is disposed between the bead filler and the pad member on an outer side in the tire-radial direction of the first rubber sheet, and
wherein thickness of the first rubber sheet and thickness formed by the second rubber sheet covering the electronic component are equal thicknesses at an opposing end part.

2. The tire according to claim 1, wherein the second rubber sheet covering the electronic component is disposed in a region from a tire-radial direction outside end of the first rubber sheet to a tire-radial direction outside end of the bead filler.

3. The tire according to claim 1, wherein the first rubber sheet is disposed in a state covering a folding end of the carcass ply which is folded back, from an inner side in the tire-width direction.

4. The tire according to claim 1, wherein the first rubber sheet further having a uniform thickness in the tire radial direction.

5. The tire according to claim 4, wherein the first rubber sheet is positioned and oriented to avoid influence caused by distortion of the tire.

* * * * *